(12) United States Patent
Feeney (10) Patent No.: US 11,319,233 B2
(45) Date of Patent: May 3, 2022

(54) CONTROL OF AQUEOUS ARSENIC, SELENIUM, MERCURY OR OTHER METALS FROM FLUE GAS (71) Applicant: Steve Feeney Consulting, LLC, Lancaster, OH (US)

(72) Inventor: Steven Feeney, Lancaster, OH (US)

(*) Notice: Subject to any disclaimer, the term of this patent is extended or adjusted under 35 U.S.C. 154(b) by 182 days.

(21) Appl. No.: 16/542,995

(22) Filed: Aug. 16, 2019

(65) Prior Publication Data
US 2020/0071219 A1 Mar. 5, 2020

Related U.S. Application Data (60) Provisional application No. 62/871,990, filed on Jul. 9, 2019, provisional application No. 62/849,359, filed (Continued)

(51) Int. Cl.
B01D 53/50 (2006.01)
B01D 53/14 (2006.01)
B01D 53/64 (2006.01)
C02F 11/143 (2019.01)
B01D 53/48 (2006.01)
(Continued)

(52) U.S. Cl.
CPC ........ *C02F 11/143* (2019.01); *B01D 53/1493* (2013.01); *B01D 53/501* (2013.01); *B01D 53/48* (2013.01); *B01D 53/64* (2013.01); *B01D 2251/408* (2013.01); *B01D 2251/608* (2013.01); *B01D 2252/10* (2013.01); *B01D 2252/103* (2013.01); *B01D 2252/504* (2013.01); *B01D 2257/302* (2013.01); *B01D 2257/60* (2013.01); *B01D 2257/602* (2013.01); *B01D 2258/0283* (2013.01); *C02F 2101/103* (2013.01); *C02F 2101/106* (2013.01); *C02F 2101/20* (2013.01); *C02F 2103/18* (2013.01)

(58) Field of Classification Search
None
See application file for complete search history.

(56) References Cited

U.S. PATENT DOCUMENTS 2,835,558 A 5/1958 Vaaler
4,366,128 A 12/1982 Weir et al.
(Continued)

FOREIGN PATENT DOCUMENTS

CN 1057069 C 10/2000
EP 2644574 A1 3/2013
(Continued)

OTHER PUBLICATIONS

Staicu et al., "Desulfurization: Critical Step Towards Enhanced Selenium Removal from Industrial Effluents", 172 Chemosphere (2017), pp. 111-119.
(Continued)

*Primary Examiner* — Daniel Berns
(74) *Attorney, Agent, or Firm* — Julia G. Radefeld (57) ABSTRACT The invention pertains to methods of reducing dissolved elements such as arsenic, selenium and mercury in aqueous solutions using, for example, various barium compounds to partition said elements to a solid phase. Such methods are particularly useful for reducing such elements at various points in coal and oil-fired power plants prior to final waste water treatment.

9 Claims, 8 Drawing Sheets

Related U.S. Application Data on May 17, 2019, provisional application No. 62/831,510, filed on Apr. 9, 2019, provisional application No. 62/719,279, filed on Aug. 17, 2018.

(51) Int. Cl.
*C02F 101/10* (2006.01)
*C02F 101/20* (2006.01)
*C02F 103/18* (2006.01)

(56) References Cited

U.S. PATENT DOCUMENTS

| | | | |
|---|---|---|---|
| 5,795,486 A * | 8/1998 | Chane-Ching | C02F 1/5236 210/723 |
| 5,830,357 A * | 11/1998 | Vredenbregt | B01D 53/73 210/611 |
| 6,180,074 B1 | 1/2001 | Fourcot et al. | |
| 6,214,304 B1 | 4/2001 | Rosenthal et al. | |
| 6,251,283 B1 | 6/2001 | Centofanti et al. | |
| 6,503,470 B1 | 1/2003 | Nolan et al. | |
| 6,855,859 B2 | 2/2005 | Nolan et al. | |
| 7,771,700 B2 | 8/2010 | Mauldin et al. | |
| 7,776,294 B2 | 8/2010 | Hurley | |
| 10,471,386 B2 | 11/2019 | Feeney et al. | |
| 2009/0056543 A1 | 3/2009 | Winkler | |
| 2009/0130013 A1 | 5/2009 | Higgins | |
| 2013/0071311 A1 * | 3/2013 | Ukai | B01D 53/50 423/235 |
| 2014/0155260 A1 | 6/2014 | Turbeville et al. | |
| 2017/0225120 A1 | 8/2017 | Feeney et al. | |
| 2017/0334752 A1 | 11/2017 | Behrens | |
| 2018/0028968 A1 | 2/2018 | Seshadri et al. | |

FOREIGN PATENT DOCUMENTS

| | | |
|---|---|---|
| EP | 2813475 B1 | 8/2016 |
| JP | 2018-202270 A | 12/2018 |
| WO | 1993000983 A1 | 1/1993 |

OTHER PUBLICATIONS

Bhattacharyya, D. et al.; Separation of Toxic Heavy Metals by Sulfide Precipitation; Separation Science and Technology;v. 14 issue 5;p. 441-452; Taylor and Francis.

Staicu et al.; Desulfurization; Critical step towards enhanced selenium removal from industrial effluents; Chemosphere 172 (2017) p. 111-119; Elsevier Ltd.; available online Dec. 29, 2016.

Tokunaga et al.; Effective Removal of Selenite and Senenate Ions from Aqueous Solution by Barite; Environmental Science and Technology, 51, p. 9194-9201; 2017; ACS Publications.

Int'l Search Report & Written Opinion (PCT/US2019/046986), dated Nov. 6, 2019.

* cited by examiner

| Typical Compunds | Concentrations (Typ.) | Units |
|---|---|---|
| Sulfate | 1,000-1,500 | mg/L |
| Chloride | 8,000 -12,000 | mg/L |
| Calcium | 750 - 1,200 | mg/L |
| Magnesium | 500 - 1,500 | mg/L |
| Sodium | 600 - 1,500 | mg/L |

CONTROL OF AQUEOUS ARSENIC, SELENIUM, MERCURY OR OTHER METALS FROM FLUE GAS

CROSS REFERENCE TO RELATED APPLICATIONS

This application claims benefit of U.S. Provisional Patent Application Nos. 62/719,279, filed Aug. 17, 2018; 62/831,510, filed Apr. 9, 2019, 62/849,359, filed May 17, 2019 and 62/871,990 filed Jul. 9, 2019 the disclosures of which are all incorporated herein by reference.

FIELD OF INVENTION

The present invention is directed to reducing the concentration of metals such as mercury, metalloids such as arsenic, and non-metals such as selenium from flue gases in a slurry prior to wastewater treatment.

BACKGROUND AND SUMMARY OF THE INVENTION

In December 2011, the Environmental Protection Agency (EPA) finalized a rule—commonly known as the MATS rule—limiting the allowable amount of mercury and other pollutants from coal and oil-fired power plants under the Clean Air Act CAA. The CAA establishes regulatory programs for both stationary sources (such as power plants and refineries) and mobile sources (such as passenger cars and trucks) of air pollutants. Among the act's regulatory programs is the National Emissions Standards for Hazardous Air Pollutants Program—NESHAP, commonly known as the Hazardous Air Pollutants Program. In establishing the program, the US Congress identified approximately 180 hazardous air pollutants and directed the EPA to draft regulations governing their emissions from stationary sources. Among these pollutants is mercury, a chemical element found in the emissions of coal and oil-fired power plants.

As of 2014, 585 power plants fell under the MATS rule. These power plants contained 1,400 oil and coal-fired electric-generating units, which produce mercury and other pollutants. As of 2014, the electric-generating units affected by the MATS rule represented 29.6 percent of the 4,718 coal and oil-powered electric-generating units in U.S. power plants. In 2011, the EPA argued that power plants account for 50 percent of mercury emissions, 75 percent of acidic gases, and between 20 percent to 60 percent of toxic metal emissions in the United States. All coal and oil-fired power plants with a capacity of 25 MW or greater are subject to the standards. Of the 5,138 coal and oil-powered generators in 2011, 1,510 generators—41.6 percent—had a capacity of 25 megawatts or greater. Until 2011, no federal standards existed limiting mercury emissions from power plants.

As a result of this rule, most plants needed to install technology to allow them to meet these new requirements. For many, this meant achieving at least 90% Hg removal or higher based on the type of fuel they were burning, and the rule requirements One of the technologies which was applicable for those plants with WFGD systems, was the addition of chemical additives into the WFGD absorbers to precipitate Hg from the aqueous phase of the scrubbing liquid. By removing mercury from the aqueous phase of the WFGD slurry liquid, operation below the regulated stack Hg limit could be achieved. While there have been many different chemicals added to the WFGD system that have been used by plant operators for capturing Hg in the aqueous phase, all chemicals used contained a common thread—they are all a form of reduced sulfur compounds. This is due to the fact that HgS has an extremely low solubility of less than $10^{-50}$. See the table 1 below for a partial listing of some of the chemicals that have been used as additives into the WFGD system to control Hg:

TABLE 1

| Chemical Formula | Common Name |
|---|---|
| NaHS | Sodium Bisulfide |
| $Na_2CS_3$ | Trithiocarbonate |
| $NaC_5H_{10}NS_2$ | Sodium diethyldithiocarbamate |
| $Na_3C_3N_3S_3$ | Trimercapto-s-triazine trisodium salt |
| FeS | Iron Sulfide |

They all share the reduced sulfur species which allows the aqueous Hg within the WFGD slurry liquid aqueous phase to react with the reduced sulfur to form the solid HgS, or some higher molecular weight alternative, due to the potentially higher molecular weight sulfide chemical used as the precipitant as shown in the table above. It should be added that, in this particular application, where the goal is to bring the flue gas Hg concentration down to about 1 ppb as it enters the plant chimney, the use of even the most basic form of sulfide is more than sufficient. However, the main point is, all are sufficient in precipitating mercury from the aqueous phase if certain operating criteria are met.

In November 2015, the Federal EPA issued a final rule revising effluent limitation guidelines ELG for certain EGU's. The rule establishes limits on As, Hg, $NO_2/NO_3$ and Se from FGD wastewater, fly ash and bottom ash transport water and flue gas mercury control wastewater. These limits were to be imposed as soon as possible after November 2018 and no later than December 2023. These requirements will be implemented through each facility's wastewater discharge permit. Subsequently, the rule was challenged in the U.S. Court of Appeals for the Fifth Circuit. In March 2017, industry associations filed a petition for reconsideration of the rule with the Federal EPA. A revised final rule revising the compliance deadlines for FGD wastewater and bottom ash transport water to be no earlier than 2020 was issued in September 2017, effectively a two-year postponement of the earlier rule, with the added potential of revised limits.

Figure 5:
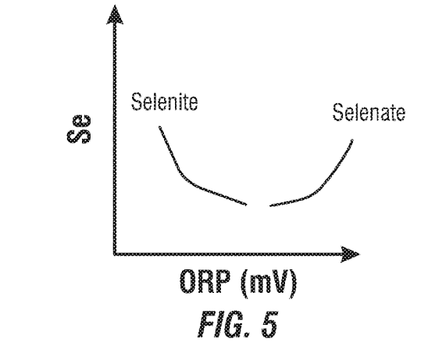
FIG. 5 shows the behavior of selenium in LSFO WFGD systems.

Of these four entities; As, Hg, $NO_2/NO_3$, and Se, generally the most troublesome for coal plants is the Se limit. Even with phys/chem systems installed, selenium can pose significant difficulties because of its ability to exist, in an oxidizing environment, as selenite $Se^{+4}$ and/or selenate $Se^{+6}$. The behavior of selenium in LSFO WFGD systems can be generalized by the graph at FIG. 5.

In LSFO WFGD, the ORP must remain positive, since without a positive ORP, the formation of $CaSO_4 \cdot 2H_2O$, or gypsum can be compromised. The precipitation of gypsum is predicated on the absorbed sulfur dioxide $SO_2$ in the form of bisulfite ion $[HSO_3^-]$ in the slurry liquid aqueous phase, working in concert with sufficient dissolved oxygen to form gypsum.

To date, attempts to control ORP in WFGD have generally been considered the path towards an adequate control of selenium in LSFO WFGD systems. This is due to the fact that the selenite is more easily treated in the downstream phys/chem system than selenate and as the ORP increases more selenate tends to be formed. Yet, controlling ORP has not been overly successful, for a number of reasons, not the least of which is the current cycling nature of coal plant operation. As boiler loads decrease, they run at higher oxygen levels in the flue gas, tending to drive the ORP levels up. Operators have attempted to mitigate this by minimizing the oxidation air blower flow, although to varying degrees of success. This approach continues to be pursued.

Thus, what are needed are better cost-effective methods to reduce, control, and/or eliminate selenium (both selenite and selenite) and other elements from, for example, WGFD slurry liquid aqueous phase. Advantageously, the instant invention accomplishes this and has other advantages as explained herein.

In one specific embodiment the invention pertains to a process for decreasing the concentration of a metal in an aqueous composition. The process generally comprises providing an aqueous solution comprising a dissolved element selected from arsenic, selenium, mercury, or a mixture thereof. A barium compound is then contacted with the aqueous solution under conditions such that one or more of the dissolved elements are partitioned to a solid phase.

In another specific embodiment the invention pertains to a method of decreasing arsenic, selenium, mercury, or a combination thereof from a flue gas. The method comprises first absorbing flue gas in an absorber comprising water and gypsum. The flue gas typically comprises one or more compounds which comprise an element selected from arsenic, selenium, mercury, or a mixture thereof. A barium compound is contacted with the one or more compounds which comprise an element selected from arsenic, selenium, mercury, or a mixture thereof. The barium compound usually is selected from the group consisting of barite, barium sulfide, barium bisulfide, barium sulfate, barium hydroxide/barium bisulfide blends, and mixtures thereof. The barium compound is contacted with the one or more compounds in an aqueous solution under conditions such that arsenic, selenium, mercury or a combination thereof are partitioned to a solid phase.

Advantageously, the relatively small amount of barite that may be added into the WFGD absorber tank to sequester selenium in the present invention is many orders of magnitude below the amount of calcium and sulfate existing in the WFGD slurry liquid aqueous phase. Barite, is the mineral form of barium sulfate, so the WFGD LSFO system offers an abundance of $[SO_4^{2-}]$ for reaction in the WFGD slurry liquid aqueous phase.

Reduced sulfur compounds are used to precipitate Hg from the WFGD slurry liquid aqueous phase in order to achieve the Hg MATS limit imposed by EPA regulation and using barite or other barium compounds preferentially sequesters selenium and other elements, under certain conditions of pH, $[Ca^{2+}]$ and $[SO_4^{2-}]$ which exist in LSFO WFGD systems and other WFGD chemistries that exist. Moreover, nearly all WFGD systems, whether calcium-based or sodium-based could benefit, to some degree, with the present invention. That is, the introduction of BaS/Ba(HS)$_2$ into sodium-based or calcium-based systems may advantageously experience a similar uptake and sequestration of selenium (selenite and/or selenate) via barium sulfate precipitation.

Advantageously, the present invention may in some embodiments deliver a dynamic coupled approach where both sulfide/bisulfide and barium sulfate could be provided in one chemical such that aqueous sulfide may be provided for the precipitation of Hg from the WFGD slurry liquid aqueous phase and barite may provide for the sequestration of selenite and selenate. What's more, there may often be a co-benefit for reducing the amount of arsenic in the aqueous phase. Advantageously, introduction of barium sulfide into the WFGD liquor often obviates the need for such ORP control for selenium speciation. Once the BaS has been introduced into the WFGD recirculation tank, the barium typically disassociates from the sulfide, allowing the sulfide to react with the aqueous As, Hg, and other metals in the slurry liquid aqueous phase, and the barium to react with the aqueous sulfate, precipitating barium sulfate which then sequesters selenium.

Unlike many metal sulfides, barium sulfide BaS, has a relatively high solubility, especially as the temperature increases. Arsenic, which is a metalloid, under certain conditions can form relatively insoluble precipitates with sulfide and barium. Thus, there is advantageously the additional co-benefit afforded by the addition of BaS into, for example, a WFGD ART, since it can provide reductions in aqueous arsenic via precipitation as barium arsenate, barium hydrogen arsenate and/or arsenic sulfide.

DETAILED DESCRIPTION OF THE INVENTION

Glossary of Terms
ART—Absorber Recirculation Tank
Arsenate—As(V); As$^{+5}$
Arsenic—As
Arsenic Sulfide—As$_2$S$_3$
Arsenite—As(III); As$^{+3}$
As—Arsenic
Barite—A mineral consisting of barium sulfate BaSO$_4$
Ba—Barium
Ba$^{2+}$—Barium ion
Barium Arsenate—Ba$_3$(AsO$_4$)$_2$
Barium Hydrogen Arsenate—BaHAsO$_4$.H$_2$O
Ba(HS)$_2$—Barium bisulfide
Ba(OH)$_2$—Barium Hydroxide
BaSeO$_4$—Barium Selenate
BaSeO$_3$—Barium Selenite
BaS—Barium sulfide
BaSO$_4$—Barium sulfate
Ca$^{2+}$—Calcium ion
CaSO$_4$.2H$_2$O—calcium sulfate dihydrate, also known as gypsum
CAA—Clean Air Act EPA—Environmental Protection Agency
EGU—Electric Generating Unit
ELG—Effluent Limitation Guidelines
Fe—Iron
FeS—Iron Sulfide
FGD—Flue Gas Desulfurization
Hg—Mercury
HgS—Mercuric sulfide
$HSO_3^-$—Bisulfite ion
Ksp—Solubility Product
LSFO—Limestone Forced Oxidation
MATS—Mercury & Air Toxics Standards
mV—milliVolt
MW—Megawatts
NESHAP—National Emissions Standards for Hazardous Air Pollutants
NiS—Nickel Sulfide
$NO_2/NO_3$—Nitrites/Nitrates
ORP—Oxidation Reduction Potential
phys/chem—Physical/Chemical Wastewater Treatment System
ppb—parts per billion
Se—Selenium
Selenate—Se(VI); $Se^{+6}$
Selenite—Se(IV); $Se^{+4}$
$SO_4^{2-}$—sulfate ion
TSS—Total Suspended Solids
WFGD—Wet Flue Gas Desulfurization
ZnS—Zinc Sulfide General Method In one embodiment the present invention pertains to a process for decreasing the concentration of an element such as arsenic, selenium, mercury, or other metal-like elements in an aqueous composition. While the invention is described here predominantly with respect to use in coal and oil-fired power plants it should be understood that the invention may be applied to virtually any aqueous solution comprising a dissolved element selected from arsenic, selenium, mercury, or mixtures thereof. The aforementioned dissolved elements are often dissolved as part of a compound such as a salt. The specific dissolved compound is not particularly critical so long as the dissolved element is capable of being partitioned into a solid phase with the addition of one or more of the various barium compounds to aqueous solution. Representative non-limiting, water-soluble compounds comprising arsenic, selenium, or mercury to which the instant invention may be applied include: arsenite ($AsO_3^{3-}$), arsenate ($AsO_4^{3-}$), selenite ($SeO_3^{2-}$), selenate ($SeO_4^{2-}$), mercuric chloride ($HgCl_2$), mercuric bromide ($HgBr_2$), and mercuric iodide $HgI_2$.

Figure 9:
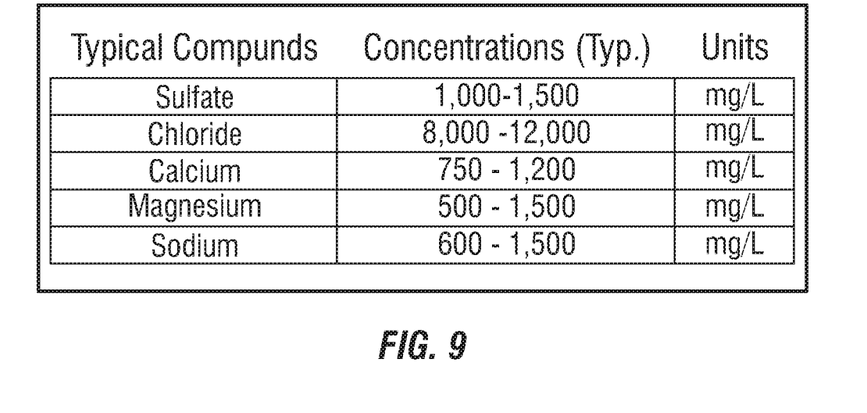
FIG. 9 shows a table of compounds and their amounts that may be found at various environmental control processes of a coal or oil-fired power plant.

Providing an Aqueous Solution Comprising Dissolved Elements to be Partitioned to the Solid Phase Often, the element to be reduced in concentration may already be dissolved in an aqueous solution. Such is typically the case when, for example, absorbing flue gas in an absorber comprising water and other ingredients such as gypsum. However, if the element is not dissolved or is part of a compound that is not soluble, then typically the element will be dissolved or put in a compound or other form that is dissolvable and then dissolved in a solution comprising water. Thus, as a first step a suitable aqueous solution comprising a dissolved element selected from arsenic, selenium, mercury, or a mixture thereof is provided. Such solutions may, of course, include other compounds so long as the compounds do not significantly interfere with the process. Such other compounds that may be present and their typical amounts include those often found in, for example, various environmental control processes of a coal or oil-fired power plant as shown in, for example, the table of FIG. 9.

Typically, the instant processes are most advantageously employed prior to final wastewater treatment in a coal or oil-fired power plant. For example, the process may be employed as part of the absorbing process or thereafter in various tanks such as a recirculation tank or subsequent storage tank. The process is often effective when there are dissolved solids in the aqueous solution (or slurry) with the dissolved element(s) as these suspended solids may facilitate partitioning the element to be reduced in concentration into a solid phase. In some embodiments the amount of dissolved solids is more than one would typically find in the final wastewater treatments such that the dissolved solids may be at least about 3%, or at least about 5%, or at least about 7%, or at least about 10% by weight of the aqueous composition. The process is also generally effective when the aqueous composition is a slurry comprising gypsum, e.g., hydrates of calcium sulfate such dihydrate. In such embodiments the amount of gypsum may be at least about 3%, or at least about 5%, or at least about 7%, or at least about 10% by weight of the total composition and up to about 25% or up to about 20% by weight of the total composition. Other ingredients that often may be present but are not necessarily present include, for example, calcium and sulfate. If present, in some embodiments the calcium concentration may be above about 300 mg/L, or above about 500 mg/L, or even above about 700 mg/L. Sodium based systems may include similar concentrations. If present, in some embodiments the sulfate concentration may be above about 200 mg/L, or above about 350 mg/L, or even above about 500 mg/L.

Contacting with a Barium Compound to Partition Element to a Solid Phase

Once a suitable aqueous solution comprising a dissolved element selected from arsenic, selenium, mercury, or a mixture thereof is provided, then the aqueous solution is contacted with a barium compound under conditions such that one or more of the dissolved elements are partitioned to a solid phase that may comprise gypsum in the amounts described above. The type of barium compound, amount of barium compound, and conditions may vary depending upon a number of factors including: the nature and amount of dissolved element, other ingredients, and desired results. Typically, the barium compound is selected from the group consisting of barite, barium sulfide, barium bisulfide, barium sulfate, or a mixture thereof. If desired, the aforementioned compounds may be formed in situ or added directly to the aqueous solution.

The temperature and pressure employed may be ambient or even slightly higher to facilitate the partitioning to a solid phase that may comprise gypsum. However, the temperature and pressure during contacting should not be such that water or other ingredients freeze, boil, or degrade such that the partitioning cannot be achieved.

The pH may be acidic, neutral, or even slightly basic. Typically, the pH is below about 9, or below about 8, or below about 7. Once the one or more compounds which comprise an element selected from arsenic, selenium, mercury, or a mixture thereof are permanently or reversibly sequestered from said aqueous solution by partitioning into a solid phase, the solid phase may be removed from the aqueous phase in any convenient manner.

If desired, the removed solid phase comprising one or more partitioned elements can be further treated. One such further treatment method may be to first add a composition comprising water and one or more barium compounds such as barite, barium sulfide, barium bisulfide, barium sulfate or a mixture thereof where these compounds also include barium hydroxide to said solid phase comprising one or more partitioned elements under conditions to form a second solid phase. Treating the removed solid phase in this manner may be particularly useful in the case of partitioned selenium.

Amounts Removed

Advantageously, the instant processes may be adjusted depending upon the type and amount of element to be reduced. Generally, the more barium compound that is added the more of the element that may be partitioned to a solid phase for removal from the aqueous composition. The desired amount of arsenic, selenium, and/or mercury to be removed depends on the application. However, for coal or oil-fired power plants the amount of selenium may generally be reduced by at least about 85%, or at least about 50%, or at least about 35% from the initial amounts. The specific amount may vary but often this means that the amount of selenium in said aqueous solution may be reduced to below about 30 µg/L, or to below about 20 µg/L, or even to below about 12 µg/L, or lower. With respect to arsenic the amount may generally be reduced by at least about 85%, or at least about 50%, or at least about 35% from the initial amount. The specific amount may vary but often this means that the amount of arsenic in said aqueous solution may be reduced to below about 30 µg/L, or to below about 15 µg/L, or even to below about 8 µg/L or lower. Thus, the type and amount of barium compound may often be advantageously selected to achieve the aforementioned limits.

Figure 1:
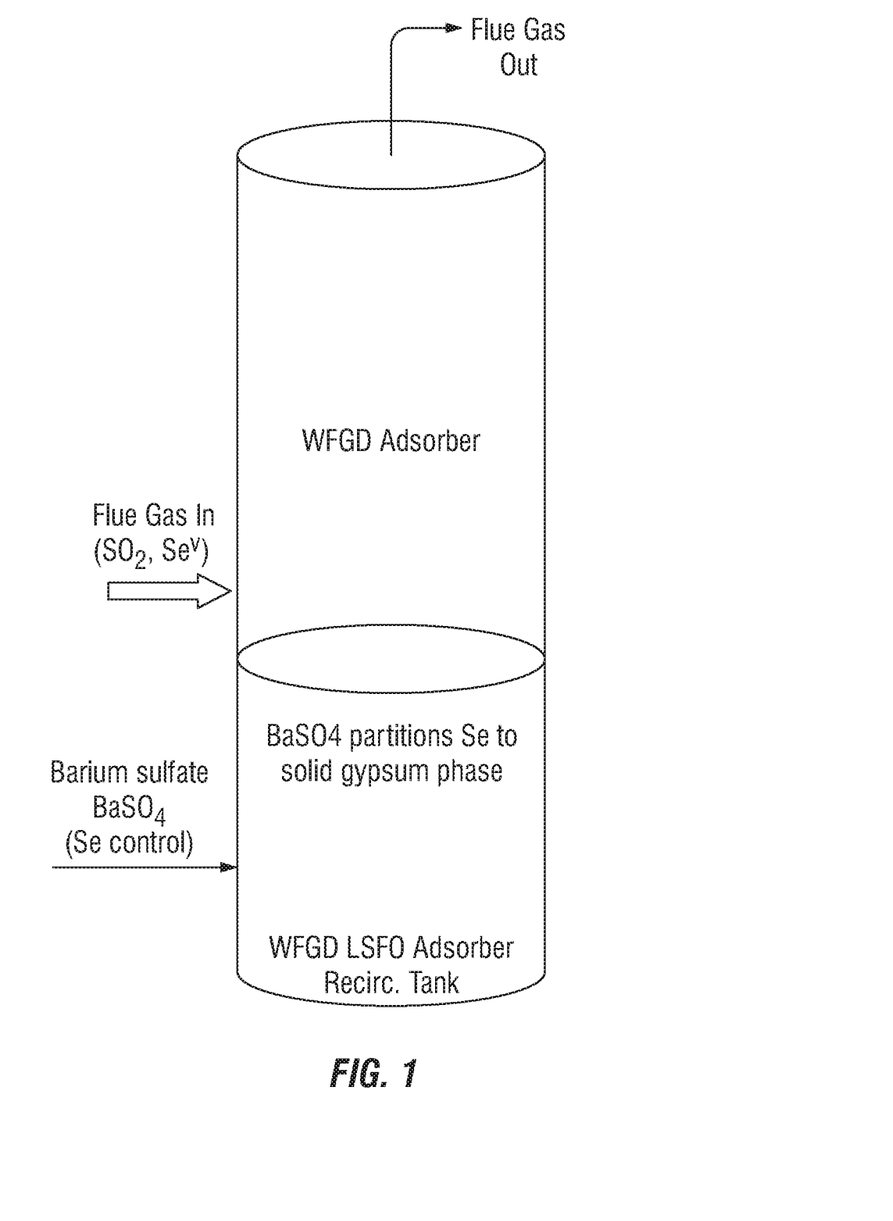
FIG. 1 shows the addition of barite (BaSO$_4$) into an absorber recirculation tank.

FIG. 1 Embodiment for the Sequestration of Se and/or as in WFGD System

In one specific embodiment, barite may be added directly to a slurry in an absorber recirculation tank (ART) to phase partition selenium to the gypsum solid phase. The introduction of barium sulfate generally has no known effect on aqueous arsenic and mercury. In the ART, there is generally a substantial amount of retention time for any barite suspended solid particles to remain in the ART slurry, before exiting the ART in a bleed-stream and being dewatered. In this approach to selenium phase partitioning, the control of arsenic and mercury is uncoupled from the phase partitioning of selenium to focus almost exclusively on selenium phase partitioning via barite addition. The barite may be added in any number of ways to the slurry in the ART, via a limestone milling system, or separately either in powder form, or as a slurry. This embodiment of selenium sequestration using barite focuses on selenium alone. This is depicted further on FIG. 1.

As shown in FIG. 1 this embodiment pertains to those situations which have little or no need of sulfide-based chemicals added to the ART for mercury control in the WFGD. In these cases, the barite can be added directly into the ART for the sequestration of selenium. Prior to the invention, chemical additives for the control of selenium were focused on altering the ORP of the absorber slurry to effect the speciation of the selenium whereas this barite addition phase partitions both selenite and selenate to the solid phase, without concerning itself with slurry ORP.

In this embodiment of the invention, the barite may be milled, or ground, before being added to the ART. This might be accomplished by adding the barite into the limestone milling system to be ground with the limestone, or could be provided pre-ground and added to the ART, or it could also be slurried in a mix tank and fed as a slurry via a pumping system.

Figure 2:
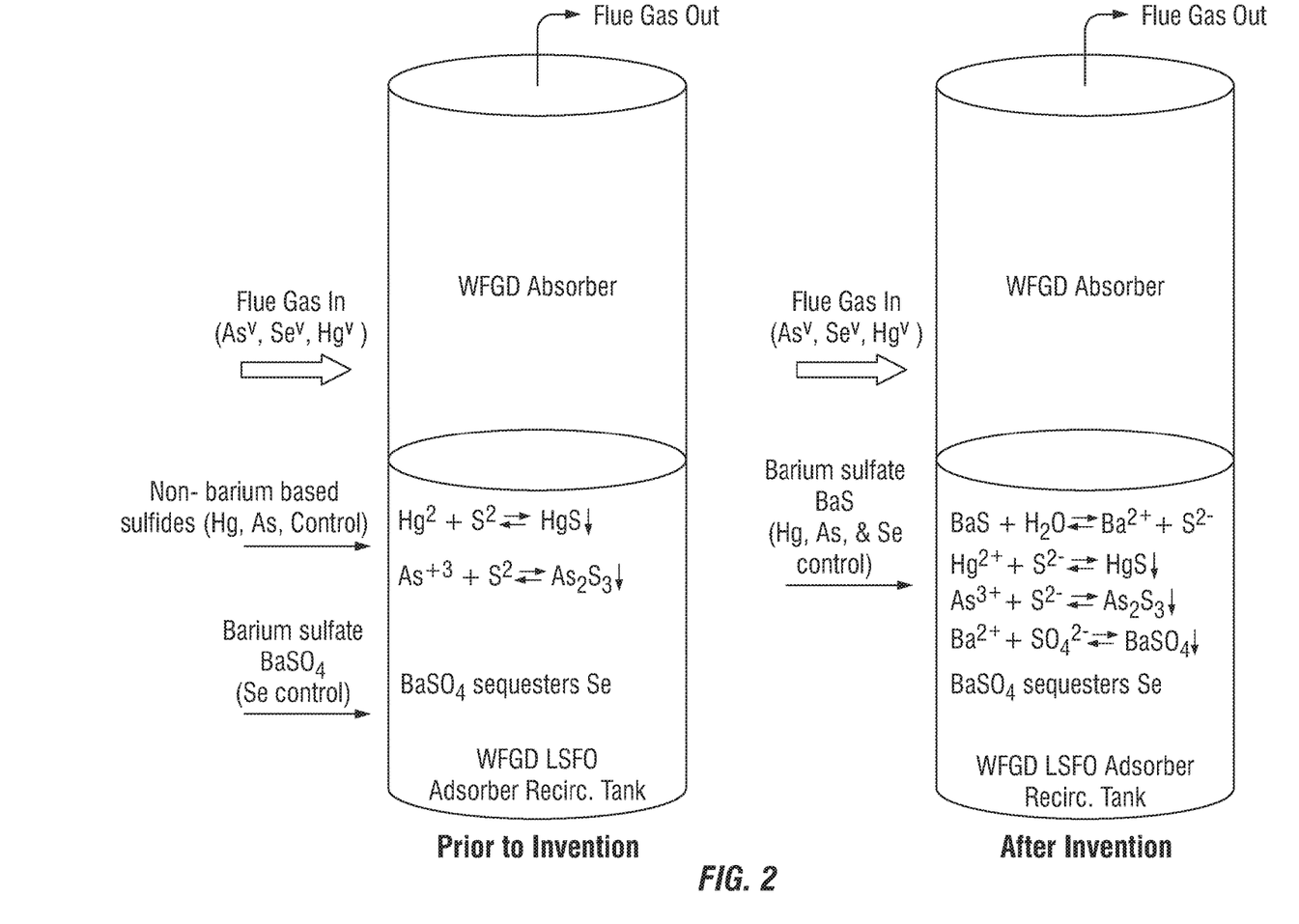
FIG. 2 shows the addition of BaS into an absorber recirculation tank.

FIG. 2 Embodiment for the Sequestration of Se and/or Ar in LFSO WFGD System

Another embodiment of this new invention pertains to chemically-coupled control for aqueous arsenic, selenium, mercury and other elements/metals. Since a WFGD absorber tower normally operates between 50° C.-55° C., by introducing barium sulfide into the WFGD system, more than an adequate amount of barium sulfide may be solubilized for the control of all three constituents. There is usually sufficient sulfide for precipitating the mercury and arsenic, and sufficient [$Ba^{2+}$] when compared with aqueous selenium and arsenic concentrations to sequester the selenium that exists in the WFGD slurry liquid aqueous phase, as well as precipitation of aqueous arsenic. Adequate BaS may be provided for coupled control, such that the 1—barium sulfate that is precipitated can adequately address the sequestration of selenite and selenate from the slurry liquid aqueous phase, 2—the precipitation of barium arsenate is adequate, and 3—the sulfide is adequate to address the emissions of Hg from the plant chimney, while 4—providing a mechanism for aqueous arsenic precipitation as arsenic sulfide or barium arsenate or barium hydrogen arsenate.

Whereas in FIG. 1 embodiments the focus is on phase partitioning the selenium into the gypsum solid phase, in this second embodiment of FIG. 2 using barium sulfide a chemically-coupled, uniquely soluble metal sulfide is provided that, once dissolved into the WFGD slurry liquid aqueous phase, provides sulfide to precipitate the aqueous mercury and arsenic, and [$Ba^{2+}$] to react with 1—[$SO_4^{2-}$], producing barite, to sequester selenium from the aqueous phase based on certain criteria such as pH, [$Ca^{2+}$], and [$SO_4^{2-}$] and 2—($AsO_4$) to produce barium arsenate. Thus, there is an additional benefit of improved barium sulfate purity, increased barium sulfate surface area, coupled to reduction in aqueous arsenic and mercury, all with the introduction of a single chemical compound.

With one chemical the Hg leaving the WFGD absorber flue gas is controlled, there is improved selenium phase partitioning to the solids, and there is reduced aqueous arsenic. Less selenium and arsenic in the slurry liquid aqueous phase generally means less costly wastewater treatment downstream.

FIG. 2 outlines the use of barium sulfide BaS as the coupled chemical for providing the bisulfide and/or sulfide ion for the precipitation of mercuric sulfide, arsenic sulfide, and the barium ion for the precipitation of barium hydrogen arsenate, barium arsenate, and barium sulfate, barium selenate with subsequent sequestration of selenium. FIG. 2 depicts the approach to control before and after the invention via chemical definition.

BaS/Ba(HS)$_2$ Introduction into ART

Unlike many metal sulfides, barium sulfide/barium bisulfide is not sparingly soluble. So, with the introduction of barium sulfide into the WFGD liquid, there is usually sufficient dissolution of the compound in the slurry liquid into its ionic parts [$Ba^{2+}$], [$S^{2-}$] and/or [$HS^-$], making the sulfide and/or bisulfide ion available to precipitate Hg and other metals from the slurry liquid aqueous phase, along with the precipitation of barium sulfate from the slurry liquid aqueous phase. Further, some of the drawbacks of inadequate barite purity may be avoided since the barium sulfate is precipitated from the slurry liquid aqueous phase. Additionally, generally there are much smaller $BaSO_4$ particle sizes than could otherwise economically be provided via grinding as the particles could be colloidal in size. The sulfide and/or bisulfide ion clears out the liquid aqueous phase of many dissolved metals to the relatively insoluble metal sulfides, providing less interference between the barium sulfate solids and the aqueous selenium to be sequestered.

One preferred approach may be to introduce the solid BaS material via compressed air where the solid material is admixed directly into the WFGD absorber recirculation tank. This would be similar to the introduction of activated carbon into the WFGD absorber recirculation tank, which is used at a number of locations in the US and elsewhere. Direct addition of the solid BaS into the WFGD absorber tank would often allow a sufficient dissolution to sequester typical selenium concentrations in WFGD slurry liquid aqueous phase. With this one may be able to dissolve 20% of the BaS at 55° C., which is more than an adequate amount compared to what may be added to sequester selenium. The BaS may be added at rates well below the saturation limit of BaS to achieve nearly full and/or complete dissolution of the BaS into the WFGD absorber recirculation tank.

In another method of addition, BaS/Ba(HS)$_2$ could be solubilized into a tank of heated water at 55° C., or more dilute solutions could be made requiring somewhat higher injection rates to achieve the same BaS/Ba(HS)$_2$ addition rates adding this BaS solution directly into an absorber recirculation loop. This would allow for chemical injection pumps (110V or otherwise) to be used for the introduction of the dissolved BaS to be added as a one-phase solution into the WFGD absorber recirculation tank.

There may be different methods of introduction of BaS into the WFGD system that could be employed depending on the particular attributes of the plant where this will be adopted.

Adding Barite or BaS to an Equalization Tank

Figure 3:
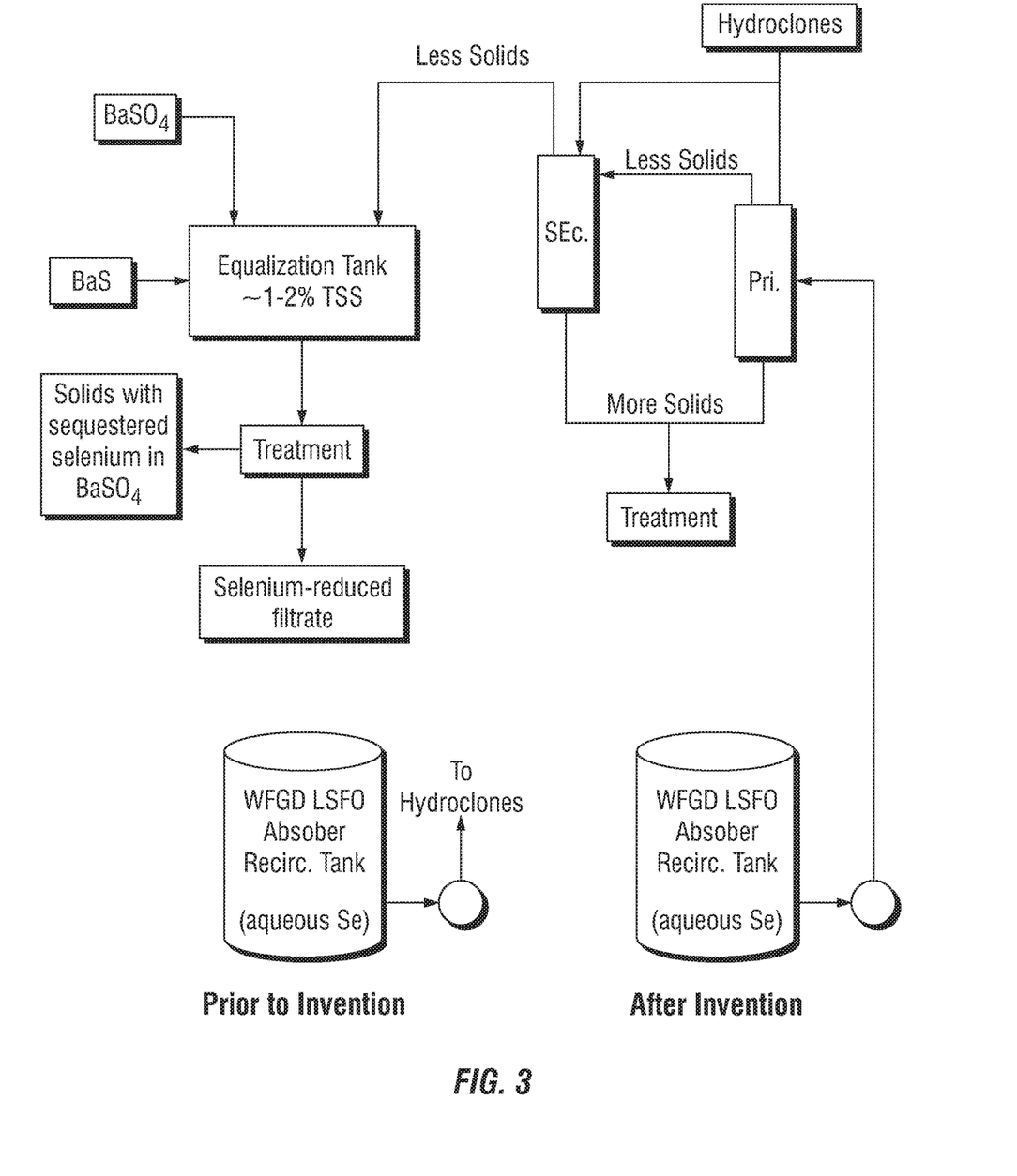
FIG. 3 shows the addition of BaS or Milled BaSO$_4$ into an equalization tank.

Instead of adding barite to the ART as in FIG. 1 or precipitating the sequestering agent BaSO$_4$ within the ART along with reductions in aqueous arsenic, mercury and other metals, by the addition of soluble BaS in FIG. 2, in this embodiment of the sequestering of selenium the barite (solid BaSO$_4$) or BaS/Ba(HS)$_2$ is added directly into the equalization tank downstream of the ART as shown in FIG. 3. With the BaSO$_4$ added to the equalization tank one need only be concerned in most cases with the sequestering of selenium, since the BaSO$_4$ would have no effect on As and Hg. However, by adding BaS/Ba(HS)$_2$ into the equalization tank, the selenium may be phase partitioned into the suspended solid phase of BaSO$_4$, precipitate certain arsenic compounds and metal sulfides such as HgS, and subsequently remove the precipitated selenium, arsenic and mercury via downstream filtering/separation of the suspended solids.

The addition of BaS into the WFGD ART provides aqueous barium which reacts with the sulfate to form barium sulfate which sequesters selenium, and barium arsenate a sparingly soluble compound. Under certain conditions, sulfide can react with the aqueous arsenic to precipitate arsenic sulfide.

In addition to the sulfide reacting with mercury to precipitate mercuric sulfide, the sulfide will also react with other dissolved metals in the WFGD slurry liquid, such as Fe, to precipitate metal sulfides thereby providing removal of these metals from the slurry liquid aqueous phase. These precipitated metals would exist in the WFGD slurry solid phase as metal sulfides of differing solubilities.

Table 2 is a table listing the approximate magnitude of the solubility products for certain metal sulfides.

| Metal Sulfide | Sol. Prod. (Ksp) |
|---|---|
| HgS | $10^{-53}$ |
| CuS | $10^{-36}$ |
| PbS | $10^{-28}$ |
| CdS | $10^{-27}$ |
| ZnS | $10^{-21}$ |
| FeS | $10^{-19}$ |
| NiS | $10^{-19}$ |

Some of these metal sulfides will be precipitated in the slurry liquid aqueous phase of the WFGD ART with the addition of the BaS, such as FeS, NiS, and ZnS. These metal sulfide particles could play a role in the subsequent precipitation of HgS, and the control of Hg emissions from the WFGD ART. Since the dissolution rate of FeS and NIS are many orders of magnitude higher than HgS, they are therefore available to provide soluble sulfide to the slurry liquid aqueous phase allowing aqueous mercury to be precipitated. In the technical paper "The Solubility of FeS" by David Rickard, *Geochimica et Cosmochimica Acta* 70(23):5779-5789, iron sulfide becomes more soluble as the pH is lowered. With the ball milling system for limestone providing a steady supply of iron to the ART, and a pH that is generally acidic for LSFO WFGD, in-situ metal sulfides are created which provide a mechanism for coupled control through the precipitation of FeS and/or NiS. The addition of soluble sulfide from the BaS/Ba(HS)$_2$ would be precipitating not just mercury, but other metal sulfides, which may be sub-micron in size, providing a secondary mechanism for mercury control through in-situ precipitation of slightly soluble metal sulfides such as FeS, NiS and ZnS. These more soluble metal sulfides, through their dissolution into the slurry liquid aqueous phase, would be a precipitating mechanism for HgS from the WFGD slurry liquid aqueous phase, providing an in-situ method of mercury emissions control from the WFGD Absorber.

FIG. 3 outlines the addition of barium sulfate BaSO$_4$ or BaS into the equalization tank downstream of the ART. This equalization tank is generally low in TSS (~1-2%). This offers a different environment in which to achieve selenium sequestration with much lower TSS than the ART. However, BaS could be added directly into the equalization tank to precipitate barium sulfate for selenium sequestration, arsenic sulfide, barium arsenate and other metal sulfides.

In this alternative approach to selenium sequestration, milled, solid barium sulfate may be added directly to the equalization tank downstream of the WFGD. It can be added to the equalization tank as a solid via compressed air, or the barium sulfate may be delivered to the equalization tank as a slurry. There may be other ways the solid barium sulfate can be added to the tank. Since there is an equalization tank in many cases downstream of the primary and secondary hydrocyclones, the equalization tank not only exists outside the WFGD absorber environment where there is typically 20% TSS, it generally has 1-2% TSS, and therefore the addition of barite may be more efficacious in this environment. In filet, the barium sulfate may be added to the equalization tank in any convenient manner. For example, BaS/Ba(HS)$_2$ may be added directly into the equalization tank as a solution, for the precipitation of barium sulfate for selenium phase partitioning to the solid phase, and precipitation of barium selenite, barium selenate, barium arsenate, barium hydrogen arsenate, arsenic sulfide and other metal sulfides.

Use of BaS Leachate or Wastewater Sources

Another chemically-coupled control embodiment include the use BaS/Ba(HS)$_2$ on general leachate and/or wastewater sources. Via the precipitation of barium sulfate to reduce the ion interference caused by aqueous sulfate, the precipitated barite provides a mechanism to sequester selenium via adsorption/coprecipitation. Soluble barium may be provided to precipitate the aqueous arsenate from solution, which can be the predominant arsenic form found in pond leachate and many wastewaters. These waters, which are generally high in sulfate and arsenate ion, and at times selenium, will benefit from the introduction of BaS/Ba(HS)$_2$ through the precipitation of solids such as barium sulfate, barium selenate or barium arsenate, and metal sulfides which would subsequently be treated via coagulation, filtration and/or sedimentation.

Figure 4:
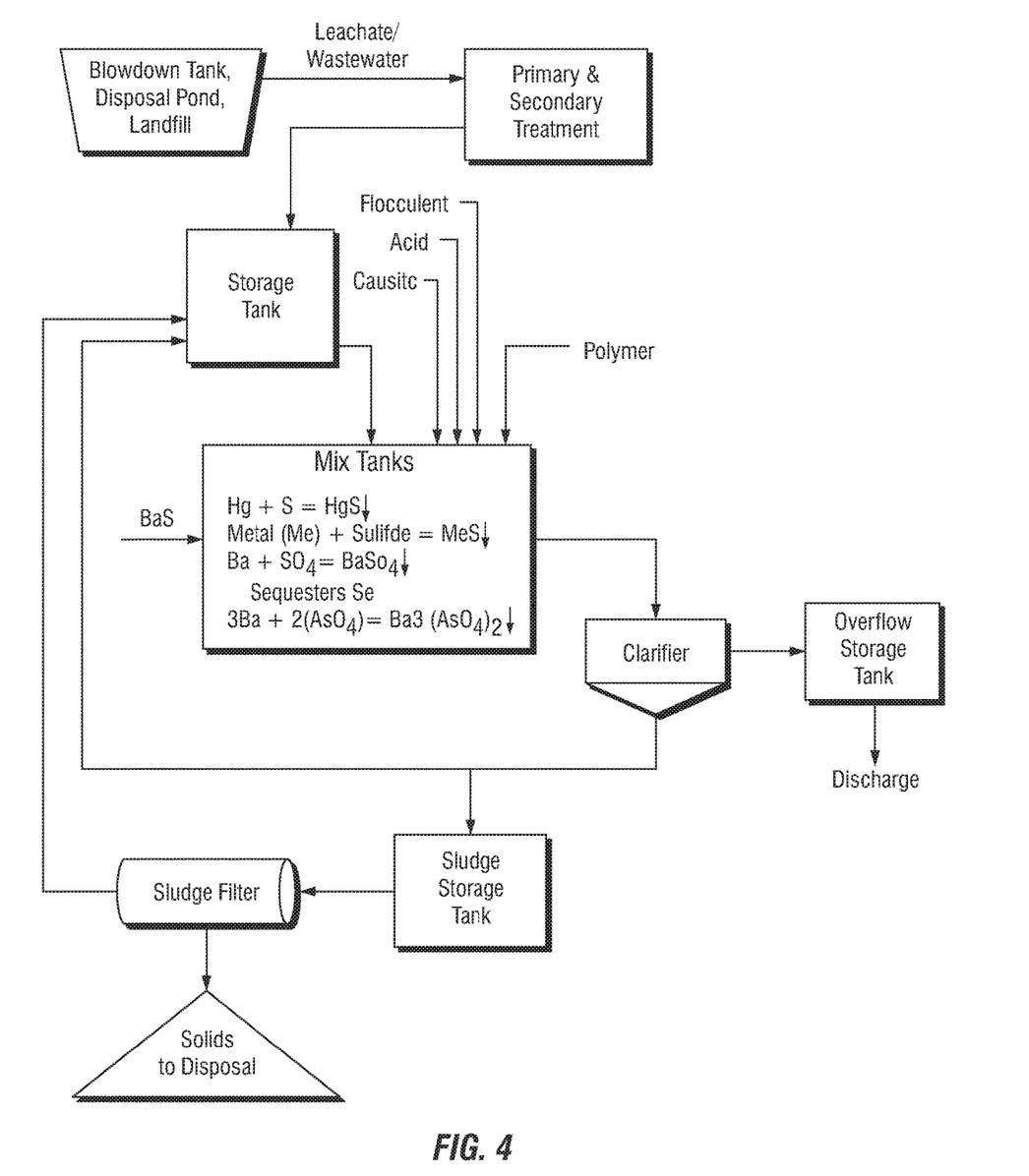
FIG. 4 shows the addition of BaS to leachate.

FIG. 4 outlines the addition of barium sulfide to leachate and/or wastewater streams subsequent to any initial primary and secondary treatment. The BaS would be added at the point of wastewater entry into the wastewater treatment facility for the removal of aqueous arsenic, selenium, mercury and other metals. The precipitation products barium sulfate, barium selenate, barium hydrogen arsenate and barium arsenate provide an initial chemical treatment step, especially beneficial for those wanting to minimize the cost of alternative treatments for aqueous selenium and arsenic.

For leachate and wastewater that are high in not only metals, but aqueous selenium and arsenic, the BaS can be introduced into a mixing tank, preferably downstream of primary and secondary treatment, where final chemical treatment is carried out. Depending on the type of leachate/wastewater treatment system being used, the BaS would be added at that point in the treatment system where the solubility of the various barium precipitates could be optimized. Should pH adjustment be needed, that can be provided by the use of either caustic or acid.

Other Embodiments

The methods described above to partition the elements to a solid phase can be used in conjunction with other steps. For example, flue gas can be desulfurized prior to, simultaneously, or even after the partitioning with barium compound(s). This is particularly the case in the event that the portioning with barium is employed in an absorber or recirculation tank of a coal or oil-fired power plants.

EXAMPLES

Field: Test Example A—Selenium

In order to validate the sequestration of the selenium via the effect of the barium sulfide on the phase partitioning of the selenium from the WFGD slurry liquid aqueous phase to the slurry solid phase, jar testing at a full-scale WFGD LSFO system was done. The results of those tests are shown in FIG. 6.

Figure 6:
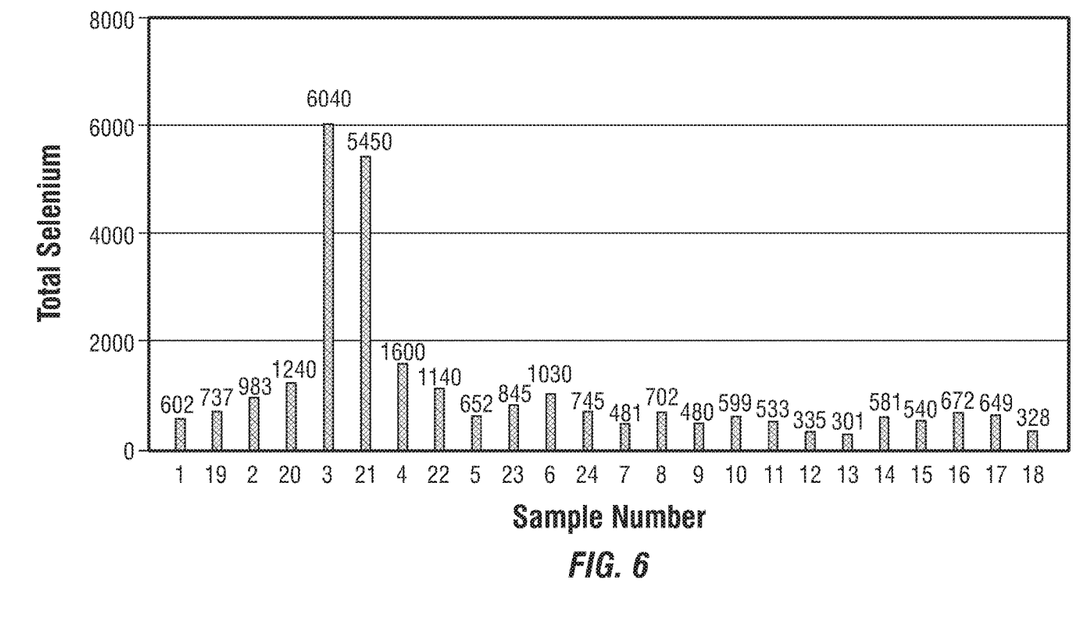
FIG. 6 shows the results of certain jar tests on selenium concentration.

Samples 1-18 of FIG. 6 reflect what was believed to be three, distinct and separate samples. Samples of slurry from the ART were used to fill two to three 1 liter sample bottles with the slurry from the tank through the bleed slurry line. Samples 1-6 represent the first 2-3 liters of sample taken for subsequent treatment and analyses; samples 7-12 represent the second two to three liters of sample taken a number of hours later after the first samples, and samples 13-18 represent the third two to three liters of sample taken a number of hours after the second samples. Samples 19-24 were a re-do of samples 1-6, since the large discrepancy between the first set of samples and the second and third sets suggested a re-determination was warranted. For each set of samples 1-6; 7-13; and 14-18; the first two samples (1&2; 7&8; 13&14 and of course 19&20) had no barium sulfide added. Then, in ascending order, samples 3-6; samples 9-12; and samples 15-18 had increasing levels of barium sulfide added.

When the slurry samples were taken to the lab for treatment and/or filtration, the slurry volume and weight were recorded. The slurry sat in the sample bottles until it was time for treatment and/or filtration. The filtration process involved first filtering the slurry through a ~1µ filter, and then filtering again through a 0.45µ filter. For those samples where BaS was added, those samples were kept on a magnetic hot plate, in an attempt to keep them as close as possible to the temperature in the ART, which is ~55 C. After adding the solution of barium sulfide, the samples were then agitated for 20-30 minutes, and then filtered.

Sample 1 showed a slurry liquid aqueous phase Se concentration of 602 µg/L. Sample 2 showed a slurry liquid aqueous phase Se concentration of 983 µg/L. Sample 2 sat longer without filtration than sample 1. Sample 7 had a Se concentration of 481 µg/L, and sample 8 had a Se concentration of 702 µg/L, sample 8 being filtered after sample 7. And again, the same thing for samples 13 and 14, where 14 was 581 µg/L, and 13 was 301 µg/L, with 14 being filtered after 13 was completed. In each case, as the slurry samples sat, the selenium partitioned from the slurry solid phase to the slurry liquid aqueous phase. In some cases this was substantial. For the first set of bleed slurry sample (1-6), samples 3-6 sat for a long time before being treated with the BaS, and subsequently filtered. For example, sample 3 had a Se concentration of 6,040 µg/L the first time it was sampled, and sample 21 (a re-run of sample 3) had a Se concentration of 5450 µg/L. Yet samples 1 and 2 had a Se concentration of 602 and 983, respectively. Samples 3-6, which included increasing amounts of BaS solution, showed a substantial reduction in Se slurry liquid aqueous phase concentration as a result of the BaS addition. It became apparent that as the slurry samples sat in the lab, outside the WFGD ART, the selenium in the slurry solid phase was partitioning to the slurry liquid aqueous phase.

Field Test Example B—Selenium

Figure 7:
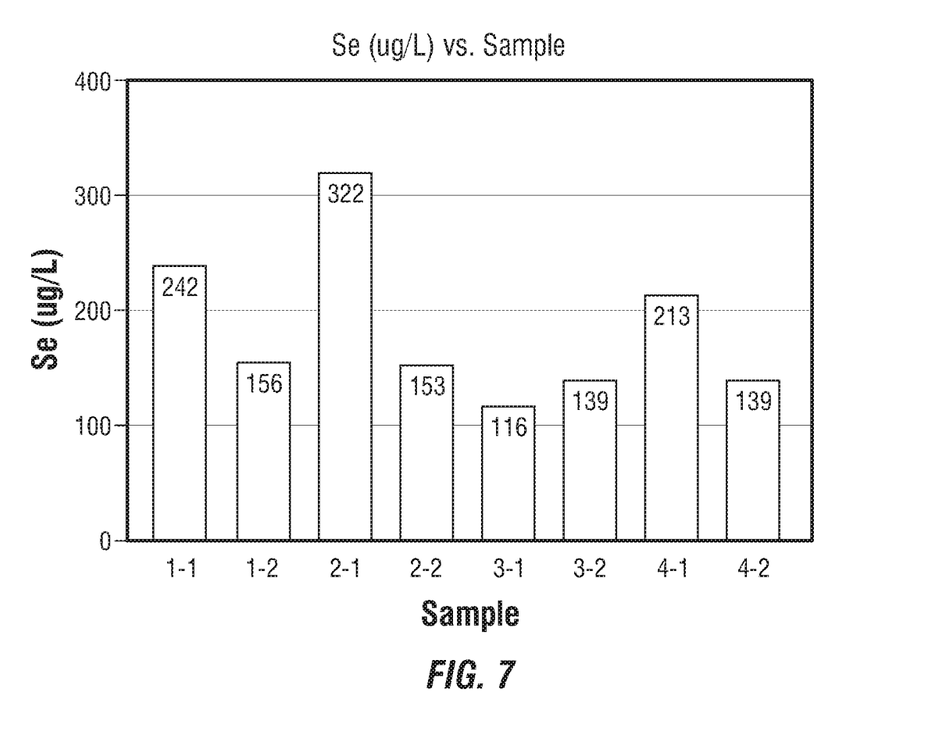
FIG. 7 shows the results of certain jar tests on selenium concentration.

The Field Test of Example A was repeated and the results are shown in FIG. 7.

All eight samples in FIG. 7 were taken from the ART bleed slurry line. Sample 1-1, 2-1, 3-1, and 4-1 had no BaS addition. Samples 1-2, 2-2, 3-2, and 4-2 had BaS addition. The bleed samples for each set; 1, 2, 3 and 4, were taken at the same time, heated on the hot plate and agitated with a magnetic stir bar, and filtered at the same time, in an effort to provide samples that were treated and filtered simultaneously. The amount of BaS used for samples 1-2 and 2-2, was half as much as used for samples 3-2 and 4-2. Both samples 3-2 and 4-2 show an outlet of 139 µg/L, while 1-2 and 2-2 average 155 µg/L.

The jar tests illuminated certain issues regarding selenium phase partitioning. Certainly, once the slurry is removed from the ART, and is allowed to sit for a time before filtration, the selenium from the slurry solid phase accumulates in the slurry liquid aqueous phase. Apparently, the longer the slurry sits, the more selenium partitions to the slurry liquid aqueous phase. The samples from the Field Test Example A testing provided that insight. Also, during the Field Test Example B testing, the jar agitation with the magnetic stirrer was completed in about twenty minute. This was done in an effort to keep samples moving through the lab. So, not only did we encounter dissolution of selenium from slurry solid to slurry liquid aqueous phase in the lab as samples sit outside the ART, our treatment time was limited. During a field test, the treatment time of the BaS in the ART at full load would generally exceed twenty hours.

Field Test Example B—Mercury

Figure 8:
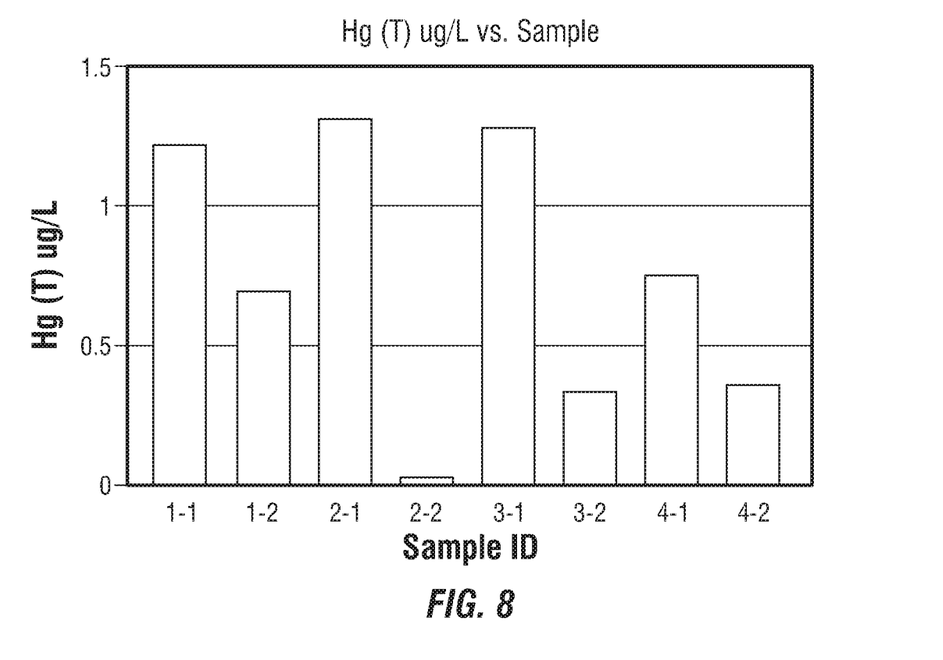
FIG. 8 shows the results of certain jar tests on mercury concentration.

The samples of Field Test Example B were tested for slurry liquid aqueous phase mercury concentration. Those results are shown in FIG. 8. Samples 1-1, 2-1, 3-1 and 4-1 shown in FIG. 8 have no BaS addition, whereas samples 1-2, 2-2, 3-2, and 4-2 had BaS addition. In each of the four cases, slurry liquid aqueous phase mercury concentration was reduced by the BaS addition.

Specific Embodiments

Figure 10:
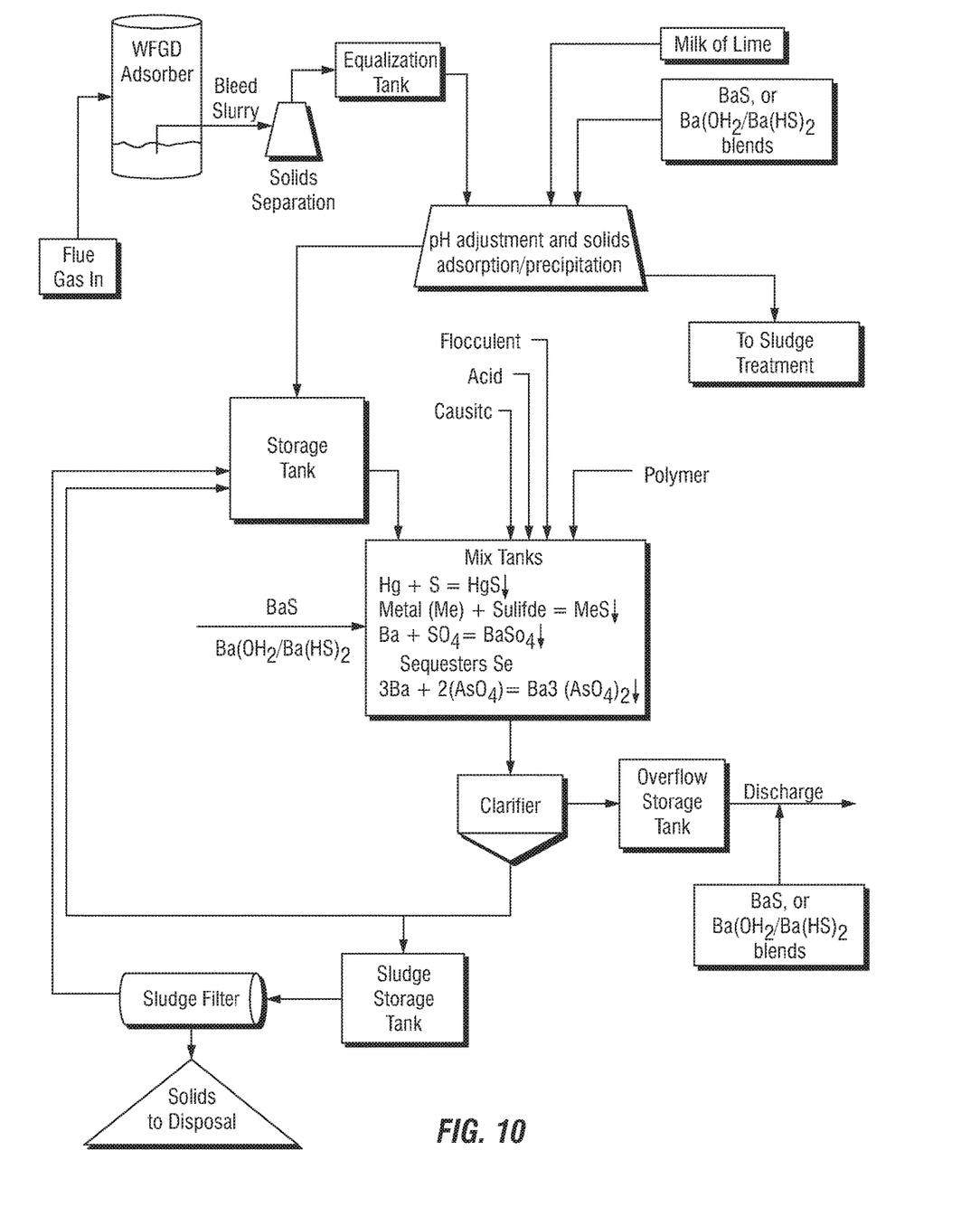
FIG. 10 shows a schematic of a typical flue gas treatment process.

The present invention may be implemented in numerous manners at all portions of the conventional flue gas treatment process as shown in FIG. 10 and it is preferred to implement the inventive processes prior to waste water treatment. Some specific embodiments include 1-5 below, 1. The introduction of barium sulfide, barium bisulfide or mixtures of barium hydroxide and barium sulfide/barium bisulfide into a slurry of at least 1%-3% total suspended solids, and containing certain levels of aqueous species, taken from Se, As and Hg and others, where the slurry liquid aqueous phase includes, but is not limited to, dissolved sodium, dissolved magnesium, dissolved calcium, dissolved chloride, dissolved sulfate, and dissolved bicarbonate/carbonate, with concentrations of dissolved metals such as mercury, iron and others.

2. The incorporation of a soluble metal sulfide, or a soluble metal sulfide solution, chosen from barium sulfide, barium bisulfide, or mixtures of barium hydroxide with either barium sulfide and/or barium bisulfide, for the simultaneous precipitation of HgS and other metal sulfides due to the aqueous sulfide, along with adsorption/coprecipitation of selenium onto/into the precipitated barium sulfate, and precipitation of certain selenium and arsenic oxyanions due to the presence of $Ba^{2+}$.

3. The incorporation of the soluble metal sulfide, or soluble metal sulfide solutions, chosen from barium sulfide, barium bisulfide, or mixtures of barium hydroxide with either barium sulfide and/or barium bisulfide, into a solids bearing stream for the direct precipitation of barium selenite, barium selenate, barium arsenate and barium hydrogen arsenate for the partitioning these adsorbed/coprecipitated compounds into the solids of the solids bearing stream.

4. The incorporation of a soluble metal or a soluble metal sulfide solution, chosen from barium sulfide, barium bisulfide, or mixtures of barium hydroxide with either barium sulfide and/or barium bisulfide, prior to any water or wastewater treatment system, in a solids-bearing stream (slurry), in which the liquid phase of the solids bearing stream contains aqueous sulfate, calcium, magnesium, chloride and bicarbonate/carbonate, and potentially other ions, such that dissolved selenium can be either adsorbed/coprecipitated into the barium sulfate solid, or precipitated as barium selenite and/or barium selenate prior to solids separation.

5. Adding barium sulfide, barium bisulfide or mixtures of barium hydroxide and barium sulfide/barium bisulfide into the very first step of a standard phys/chem wastewater treatment, in which the barium mixture is included with the milk of lime mixture, where the wastewater stream to be treated has the pH raised to above 9, or above 10, or above 11, and where the wastewater treatment contains certain levels of aqueous species, taken from Se, As, Hg and others, and where the aqueous phase includes, but is not limited to dissolved sodium, magnesium, calcium, chloride, sulfate, and bicarbonate/carbonate, to take advantage of the higher pH environment which is more favorable for adsorption/coprecipitation of selenium, and the precipitating characteristics of the $Ba^{2+}$.

What is claimed is:

1. A method of decreasing selenium and one or more of arsenic, mercury, or any combination of two or more thereof from a flue gas, wherein the method comprises:
   absorbing a flue gas operating at acidic pH values in an absorber comprising water and gypsum wherein said flue gas comprises one or more compounds which comprises selenium and an element selected from arsenic, mercury, or a mixture thereof;
   supplying one or more sulfides of barium into a desulfurization unit that is connected to the flue gas; and
   contacting the one or more sulfides of barium with the one or more compounds which comprises selenium and an element selected from arsenic, mercury, or a mixture thereof, wherein the one or more sulfides of barium compound is selected from barium sulfide, barium bisulfide, and mixtures thereof,
   wherein the one or more sulfides of barium is contacted with the one or more compounds in a solids-burdened, sulfate-laden aqueous solution under conditions such that selenium and one or more selected from arsenic, mercury or a combination thereof are partitioned to a solid phase.

2. The method of claim 1 wherein the flue gas is contacted with a slurry comprising water and gypsum and wherein said gypsum comprises at least about 10% gypsum by weight based on the total weight of said slurry.

3. The method of claim 1 further comprising desulfurizing said flue gas in the absorber.

4. The method of claim 1 wherein the one or more compounds that comprises selenium and an element selected from arsenic, mercury, or a mixture thereof are sequestered from said aqueous solution by converting said compounds from the aqueous phase to the solid phase due to the use of one or more sulfides of barium.

5. The method of claim 1 further comprising separating said solid phase comprising one or more partitioned elements from the aqueous solution.

6. The method of claim 5 further comprising treating said solid phase comprising one or more partitioned elements.

7. The method of claim 6 wherein said treating comprises adding water and one or more barium compounds selected from, barium sulfide, barium bisulfide, and a mixture thereof to said solid phase comprising one or more partitioned elements under conditions to form a second solid phase.

8. The method of claim 1 wherein the amount of one or more sulfides of barium is selected such that the amount of selenium in said aqueous solution is reduced to below about 30 µg/L.

9. The method of claim 1 wherein the amount of one or more sulfides of barium is selected such that the amount of arsenic in said aqueous solution is reduced to below about 8 µg/L.

* * * * *